United States Patent [19]

Dietrich et al.

[11] 4,119,299

[45] Oct. 10, 1978

[54] CABLE DRUM ARRANGEMENT WITH BRAKE

[75] Inventors: Albert Dietrich; Alois Breiing, both of Markdorf, Fed. Rep. of Germany

[73] Assignee: Dornier Gmbh, Friedrichshafen, Fed. Rep. of Germany

[21] Appl. No.: 724,932

[22] Filed: Sep. 20, 1976

[30] Foreign Application Priority Data

Oct. 15, 1975 [DE] Fed. Rep. of Germany ....... 2546119

[51] Int. Cl.² .............................................. B66D 5/04
[52] U.S. Cl. ..................................... 254/159; 188/185
[58] Field of Search ................ 188/184, 185; 254/159, 254/157

[56] References Cited

U.S. PATENT DOCUMENTS 3,333,821  8/1967  Pohl et al. .......................... 254/150 R

FOREIGN PATENT DOCUMENTS 112,428 11/1898 Fed. Rep. of Germany ........... 188/184
198,363  4/1906 Fed. Rep. of Germany ........... 188/185
173,962  3/1935 Switzerland .............................. 188/185

Primary Examiner—Albert J. Makay
Assistant Examiner—Donald W. Underwood
Attorney, Agent, or Firm—Hans Berman

[57] ABSTRACT

A cable drum arrangement including a brake drum on a stationary support and a brake shoe on a carrier for the cable drum includes a flyweight and a compression spring radially interposed between flyweight and brake shoe which biases the brake shoe toward the brake drum by centrifugal force generated by the fly-weight while a cable unwinds from the drum. Unwinding of the last layer of cable from the cable drum releases a coupling connecting the drum to the carrier, and the resulting, limited, angular displacement of carrier and cable drum causes a cam to stress the spring and thereby to arrest the carrier. During unwinding, the spring reduces braking stress in the cable by damping radial movement of the flyweight during sudden increases in rotary speed.

5 Claims, 3 Drawing Figures

CABLE DRUM ARRANGEMENT WITH BRAKE

This invention relates to a cable drum arrangement in which the drum is braked during unwinding of a cable therefrom by a centrifugally actuated brake, and particularly to an improvement in the cable drum arrangement disclosed in the commonly owned U.S. Pat. No. 3,333,821.

The invention will be described hereinbelow with specific reference to a towing arrangement for an aerial target, but is useful in other applications in which a cable or like tension member is unwound from a cable drum under tension applied to the cable, the rate of unwinding is to be controlled, and the drum is to be stopped gradually before the tension member is fully unwound.

It is common practice to carry an aerial target aloft on an aircraft, and to release the target at the desired altitude to put a safe distance between the aircraft and the projectiles fired at the target while the target is being towed. For this purpose, a cable attached to the released target is unwound from a drum on the aircraft. Friction of the air acting on the target and the unwound portion of the cable tends to increase the unwinding rate, and it was proposed in the earlier patent to have a centrifugally operated brake shoe act on a brake drum fixed to the aircraft for exerting a braking force commensurate with the rotary speed of the cable drum, and further to provide a spring whose braking force is independent of the drum speed and which brings the drum to a halt after the towing cable is paid out.

In the known arrangement, the brake shoe is heavy enough to act as a flyweight, and the radial braking force varies instantaneously with the rotary speed of the cable drum. During transient changes in the speed or direction of the towing aircraft, as in turbulent air, the tension in the unwinding towing cable may increase suddenly, and is further increased by the response of the brake to the resulting higher rotary speed of the cable drum. The cable must be dimensioned to resist such peak loads, and the frictional drag exerted by the cable on the towing aircraft increases with cable diameter. It is the primary object of this invention to permit the use of a thinner cable and thereby to permit a higher towing speed by reducing the maximum stresses in the towing cable.

It has been found that the portions of the peak loads which are due to transient tightening of the brake can be avoided by separating the brake shoe proper from the flyweight, and by transmitting centrifugally generated forces from the flyweight to the brake shoe through a spring which tends to distribute peaks of transmitted centrifugal force over a longer period, and thereby to reduce the magnitude of peaks in braking force. The same spring is used for providing braking force during the final deceleration of cable drum rotation in a manner known in itself. The advantages of the invention are thus achieved without increasing the weight of the brake and of the entire cable drum arrangement.

In one of its more specific aspects, the invention provides a carrier mounted on a normally stationary support for rotation about an axis. A friction element on the support may be engaged by a friction element movable on the carrier to impede rotation of the latter. A flyweight is mounted on the carrier for joint rotation and radial movement, and centrifugally generated force may be transmitted between the flyweight and the movable friction element during joint rotation of the carrier by a mechanism including a spring and operatively interposed between the flyweight and the movable friction element. A stressing device responds to completion of a predetermined number of carrier revolutions by increasing the stress in the spring and for thereby transmitting to the movable friction element a force greater than the centrifugally generated force. A cable drum is connected to the carrier for joint rotation during the afore-mentioned predetermined number of revolutions and after the increasing of the spring stress.

Other features, additional objects, and many of the attendant advantages of this invention will readily be appreciated as the same becomes better understood by reference to the following detailed description of a preferred embodiment when considered in connection with the appended drawing wherein.

Figure 1:
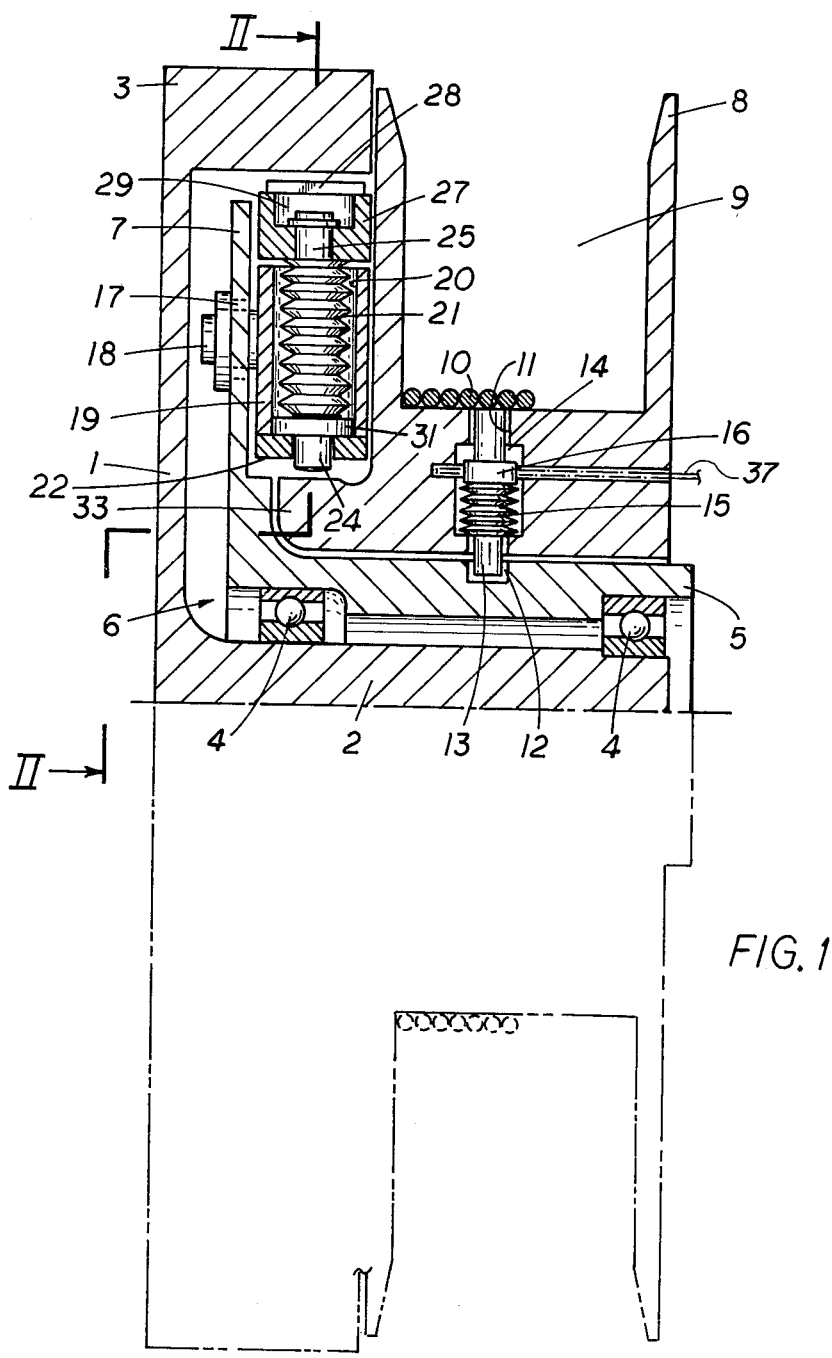
FIG. 1 illustrates a cable drum arrangement of the invention in fragmentary section on its axis of rotation.

Referring now to the drawing in detail, and initially to FIG. 1, there is shown one half of a cable drum arrangement of the invention, the non-illustrated half being a mirror image of what is seen in FIG. 1. The cable drum arrangement includes a supporting plate 1 to which an integral shaft 2 and a circular, axially projecting rim 3 coaxial with the shaft are integrally fastened. Ball bearings 4 rotatably mount the tubular hub portion 5 of a carrier 6 on the shaft 2. A circular flange portion 7 of the carrier 6 is fixedly attached to one axial end of the hub portion 5. A cable drum 8 is movably mounted on the outer, cylindrical face of the hub portion 5. A circumferentially open groove 9 of the drum 8 receives a towing cable 10 of which only the last few turns are still wound on the drum in the illustrated condition of the apparatus.

Radial bores 11 are circumferentially distributed in the cable drum 8 and extend from the bottom of the groove 9 to the cylindrical face of the hub portion 5 in radial alignment with blind bores 12 in the hub portion, only one bore 11 and associated elements being visible in the drawing. A coupling rod 13 is retained in the bore 11 by the residual turns of the cable 10 which cover the orifice of the bore in the groove 9 and engage one end of the rod, the other end being received in the blind bore 12. A central portion 14 of the bore 11 is radially enlarged to receive a compression spring 15 which is held under stress by a collar 16 on the rod 13. The rod 13 thus prevents relative axial and angular movement of the cable drum 8 and the carrier 6 until a few more turns of the towing cable 10 are unwound from the drum 8 and permit the spring 15 to withdraw the coupling rod 13 from the blind bore 12 of the carrier 6. As is known from the afore-mentioned earlier patent, an arresting needle 37, shown in phantom in FIG. 1, makes it possible to retain the rod 13 against the pressure of the spring 15 until the lowermost layer of cable is wound on the cable drum 8.

Figure 2:
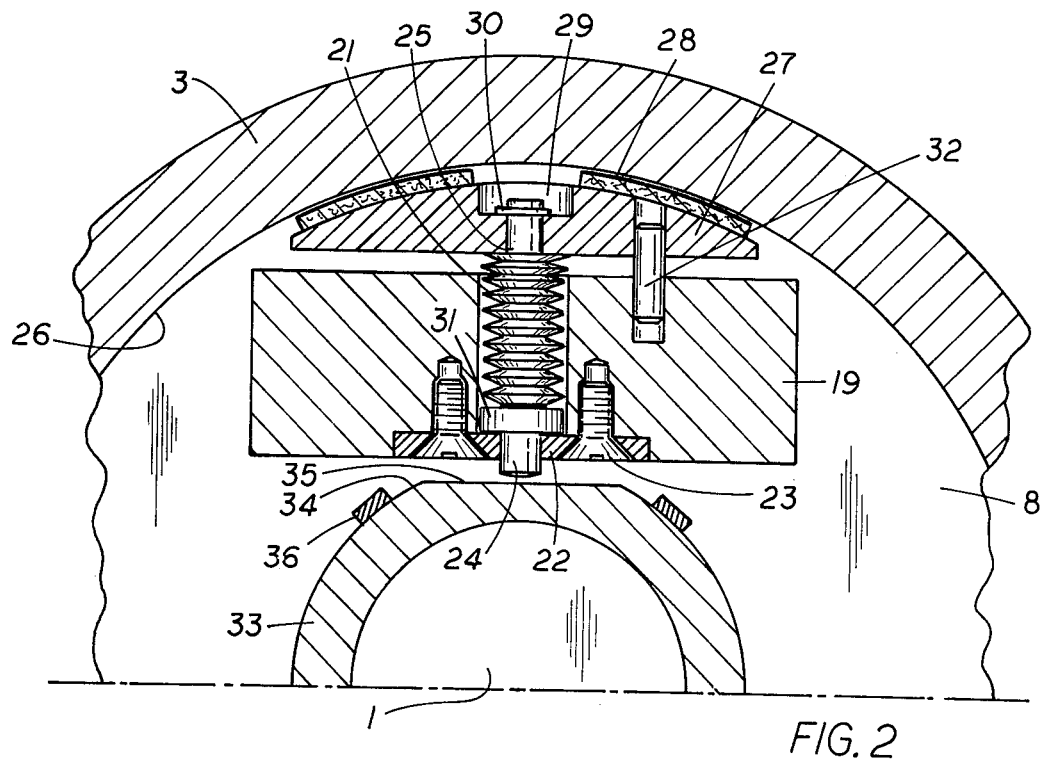
FIG. 2 shows the device of FIG. 1 in section on the line II—II.
Figure 3:
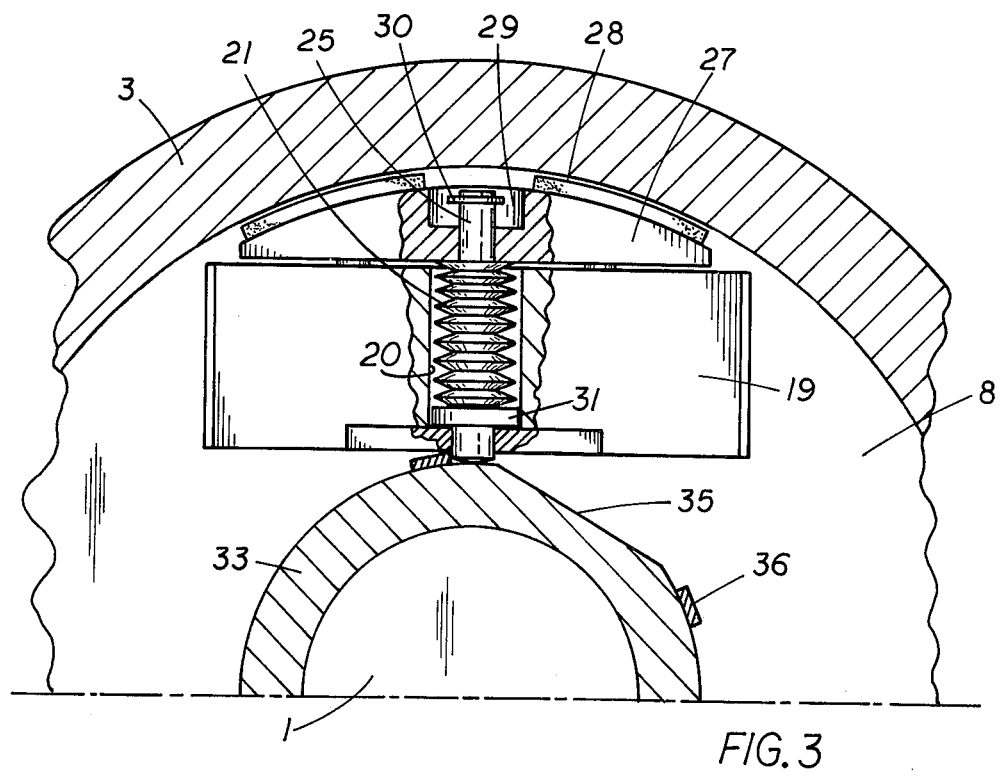
FIG. 3 shows the device of FIG. 2 in another operative condition.

A radially elongated slot 17 in the flange portion 7 guides a bar 18 on a flyweight 19 of elongated, rectangular, prismatic shape, evident from joint consideration of FIGS. 1 and 2. A cylindrical, radial bore 20 through the center of the flyweight 19 holds a stiff compression spring 21 similar to the spring 15 and constituted by a stack of belleville washers. The radially inner end of the bore 20 is restricted by an apertured closure plate 22 recessed in the flyweight 19 and fastened thereto by screws 23.

A reduced end portion 24 of a pin 25 projects radially inward from the aperture in the plate 22. The pin passes through aligned central openings in the washers of the spring 21 and radially outward of the bore 20 toward an inner cylindrical friction face 26 of the rim 3 through an opening in a brake shoe 27. The brake shoe has the general shape of a cylinder segment, and its outer, cylindrically arcuate face carries friction linings 28. A central recess 29 in the arcuate brake shoe face receives the radially outer end of the pin 25. The pin 25 is secured against radially inward movement from the position shown in FIGS. 1 and 2 by a spring clip 30 resting on the bottom of the recess 29. The two ends of the spring 21 abut under compressive stress against the radially inner face of the brake shoe 27 and a collar 31 fixed on the pin 25 adjacent the closure plate 22.

FIGS. 1 and 2 show the condition of the apparatus during unwinding of the towing cable 10 which causes rapid rotation of the cable drum 8 and of the coupled carrier 6 on the shaft 2. Centrifugal forces acting on the flyweight 19 hold the closure plate 22 in abutting, force-transmitting engagement with the collar 31, and the centrifugally generated force is further transmitted by the spring 21 and the brake shoe 27 to the friction linings 28 to bias the linings into engagement with the friction face 26 of the rim 3. The brake shoe 27 is secured against axial and circumferential movement relative to the flyweight 19 and the carrier 6 by the pin 25 and by locating pins 32 received in aligned bores of the brake shoe 27 and the flyweight 19, only one pin 32 being illustrated in order not to crowd the drawing.

The cable drum 8 carries a fixed radial cam 33 whose cam face has a main portion 34 cylindrical about the axis of drum rotation and two diametrically opposite flats 35 radially spacedly aligned with the ends 24 of the two pins 25, as long as the coupling rods 13 prevent relative angular movement of the drum 8 and the carrier 6 from the relative position shown in FIGS. 1 and 2. When the rods 13 release the carrier 6, the drag of the towing cable 10 causes the drum 8 to turn faster than the carrier 6 whose rotation is impeded by frictional engagement of the friction linings 28 on the brake shoe 27 with the friction face 26 of the rim 3 under the pressure mainly exerted by the flyweight 19, but also by centrifugal forces acting on the much lighter brake shoe 27. The ensuing angular movement of the cam 33 causes engagement of each pin end 24 as a cam follower with the associated flat 35 and ultimately with the main portion 34 of the cam face, whereby each spring 21 is further stressed between the moving collar 31 and the brake shoe 27 whose radial movement is limited to an insignificant value by the barely compressible brake linings 28. The radial braking force transmitted from the additionally stressed spring 21 by the brake shoe 27 to the linings 28 is much greater than that transmitted from the flyweight 19 at the highest rotary speed, and the carrier 6 is brought to a gradual halt.

Relative angular movement of the cable drum 8 on the hub portion 5 of the carrier is limited to about 45° by abutments 36 radially projecting from the main portion 34 of the cam face adjacent the two ends of each flat 35. After relative movement of the cam 33 and the cam follower 24 to compress the spring 21, an abutment 36 engages the cam follower end 24 of the pin 25, and joint rotation of the carrier 6 with the cable drum 8 is resumed at a gradually decreasing rotary speed while the carrier 6 is braked by the spring 21.

During a normal towing run, the cable 10 is thus unwound from the drum 8 at a substantially constant rate determined by an equilibrium between the friction of air acting on the cable and the attached target and the braking force provided mainly by the flyweight 19. When the cable is almost completely unwound, the cable drum 8 turns briefly relative to the carrier 6, and the braking force is reinforced by the stress of the spring 21 deformed by the camming cooperation of the pin end 24 and the cam 33. The resulting deceleration of drum rotation gradually reduces the centrifugal forces transmitted from the flyweight 19 to the friction lining 28 to zero.

The spring 21 is chosen to transmit normal centrifugal forces from the flyweight 19 to the brake shoe 27 without significant deformation, but to yield sufficiently under a transient peak load to distribute such a load over a lengthened period, thereby reducing its magnitude.

The releasable coupling arrangement known from the earlier patent has been found reliable in operation because of its simplicity, and is also preferred in this invention. However, other releasing devices responsive to completion of a predetermined number of joint revolutions of the cable drum 8 with the carrier 6 may be substituted in an obvious manner to release the cable drum briefly from the carrier, and the increase in spring stress may be brought about otherwise than by the known angular displacement of a cam. A counter-operated switch in circuit with a solenoid having an armature fastened to the pin 25 is merely one of the alternatives which will readily suggest themselves to those skilled in the art on the basis of the instant teachings.

It should be understood, therefore, that the foregoing disclosure relates only to a preferred embodiment of the invention, and that it is intended to cover all changes and modifications of the example of the invention herein chosen for the purpose of the disclosure which do not depart from the spirit and scope of the appended claims.

What is claimed is:
1. A cable drum arrangement comprising:
 (a) a support member having a friction face circularly arcuate about an axis;
 (b) a carrier member mounted on said support member for rotation about said axis;
 (c) a brake shoe mounted on said carrier member,
   (1) said brake shoe being radially movable toward and away from a position of engagement with said friction face,
   (2) the engaged brake shoe and friction face impeding said rotation;
 (d) a flyweight mounted on said carrier member for joint rotation with and radial movement on said carrier member relative to said axis;
 (e) a cam follower member retained by said flyweight for joint rotation therewith;
 (f) abutment means engaging said flyweight and retained on said cam follower member for joint radial movement with said flyweight;
 (g) a compression spring radially interposed between said abutment means and said brake shoe for transmitting centrifugally generated force to said brake shoe during said joint rotation;

(h) actuating means responsive to completion of a predetermined number of revolutions of said carrier member about said axis for moving said cam follower member toward said brake shoe and for thereby increasing the stress of said spring sufficiently for transmitting to said brake shoe a force greater than said centrifugally generated force;

(i) a cable drum connected to said carrier member for rotation therewith about said axis during said predetermined number of revolutions and after said increasing of said stress.

2. An arrangement as set forth in claim 1, further comprising coupling means for coupling said cable drum to said carrier member, said coupling means including means for releasing said cable drum from said carrier member for relative angular displacement in response to completion of said predetermined number of revolutions, said actuating means responding to said displacement by moving said cam follower member.

3. An arrangement as set forth in claim 2, wherein said actuating means include cam means on said carrier member engaging said cam follower member for moving the same toward said friction means.

4. An arrangement as set forth in claim 1, wherein said actuating means include cam means angularly movable about said axis for engagement with said cam follower member, said stressing means responding to said completion by angularly moving said cam means.

5. An arrangement as set forth in claim 1, wherein said brake shoe is lighter in weight than said flyweight.

* * * * *